United States Patent Office 3,364,160
Patented Jan. 16, 1968

3,364,160
ORGANO-POLYSILOXANE COMPOSITION CONVERTIBLE AT ROOM TEMPERATURE
Hans Dietrich Gölitz, Cologne-Stammheim, Klaus Damm, Cologne-Flittard, and Walter Noll, Opladen, Germany, assignors to Farbenfabriken Bayer Aktiengesellschaft, Leverkusen, Germany, a corporation of Germany
No Drawing. Filed Aug. 5, 1966, Ser. No. 570,404
Claims priority, application Germany, Aug. 16, 1965, F 46,910
9 Claims. (Cl. 260—18)

ABSTRACT OF THE DISCLOSURE

Novel cross-linking agents are disclosed which can be combined with plastically shapable organosiloxanes; the resulting novel mixtures or compositions being storage stable under exclusion of all moisture. The cross-linking reaction takes place on exposure of the compositions to water, atmospheric humidity sufficing, at temperatures below 50° C. Depending on the other additives present, i.e., fillers etc., the compositions are adapted for use in the production of rubber-elastic articles, insulation for electric equipment, etc. The novel compositions comprise:
(1) a siloxane having the formula:

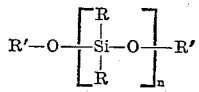

wherein $n$ is a whole number having a value of at least 1, R′ is hydrogen, or alkyl, at least half of the substituents R are methyl, the remaining substituents R each being hydrogen, alkyl, alkenyl or aryl, said siloxane can additionally contain up to 10 mol-percent of siloxane units having the formula $RSiO_{3/2}$, fillers, α,ω-bis(trimethylsiloxy)-polydimethylsiloxane (up to 10% by weight of the first mentioned siloxane), and methylpolysiloxanes composed of $(CH_3)_3SiO_{1/2}$ and $SiO_2$ units in a molar ratio of 1:1 to 1:2 (up to 50% by weight of the first-mentioned siloxane); and
(2) a cross-linking agent having the formula:

$$X_{4-a}SiZ_a$$

wherein X is hydrogen, alkyl or aryl, $a$ has a value of 3 or 4 and each Z is alkoxy containing 1 to 4 carbon atoms or an Si-N bonded carboxylic amide radical having one of the following formulae:

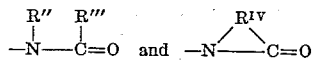

wherein R″ is alkyl or aryl, R‴ is hydrogen, alkyl or aryl and $R^{IV}$ is alkylene or alkarylene, at least one alkoxy and one Si-N bonded carboxylic amide radical being present.

---

This invention relates to plastically shapable compositions comprising organopolysiloxanes and certain cross-linking agents, which compositions are convertible into the solid elastic state at temperatures below 50° C. In particular the invention is concerned with such compositions which are prepared with the exclusion of water and then stored in impervious containers and which after removal from the containers react under the action of water, for instance the humidity of the atmosphere, to form elastomers.

Compositions are known which perform this effect and contain, in addition to the convertible organopolysiloxane and fillers, either alkoxy-silicon compounds and an organometallic compound, a trifunctional aminoalkyl-substituted or aminoalkoxyl-substituted silane or silazane, or trifunctional alkylacyloxysilanes. In the first-mentioned of these three cases, all the components of the mixture have to be completely anhydrous in order to delay the cross-linking reaction. However, since such a mixture even with a water content of only ¹⁄₁₀₀₀ percent by weight is not storable, this process cannot be used commercially, particularly when the colloidally dispersed silica products which are generally preferred because of their reinforcing effect are chosen as fillers. The amino compounds admixed as cross-linking agents in the second case give off in use malodorous and mildly toxic amines, which moreover, for example act on copper and alloys thereof, to cause corrosion which is visible in a short time and, in the case of sensitive electrical apparatus, destructive thereof, their chief disadvantage, however, is that mixtures containing such cross-linking agents are also not sufficiently storable, since the amine bases which are split off hydrolytically by traces of water, in particular, as is known, in the presence of the aforesaid highly active silica fillers, lead to premature cross-linking, despite closure. Finally, from the aforesaid alkylacyloxysilanes there is liberated, during the hydrolysis initiating the cross-linking, a carboxylic acid which can have a corrosive action, can depolymerize the organopolysiloxanes at elevated temperatures and, particularly in the case of methyltriacetoxysilane which is most commonly used and which splits off acetic acid, is attended by a strong odor nuisance. Furthermore, these silane derivatives are thermally unstable so that in the case of longer storage at tropical temperatures their decomposition into alkylsiloxanes and acid anhydrides must be expected. Since they are, moreover, crystalline at room temperature, they must be used hot for the preparation of the mixtures, for which purpose heated pipes and other devices are necessary.

According to a more recent proposal the disadvantages mentioned above can be avoided by using, instead of the known cross-linking agents, certain N-silyl-substituted carboxylic acid amides of the formula $X_{4-a}SiZ_a$ or the average formula

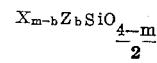

wherein each substituent X is a hydrogen atom or an alkyl or aryl radical, $a=3$ or 4, $m$ is a numerical value of more than 1 and at most 3, the number $b$ is chosen of a magnitude such that each molecule of the aforesaid average formula contains at least three substituents Z, and the substituents Z are Si-N bonded carboxylic acid amide radicals of the formula

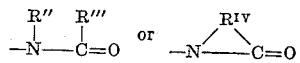

wherein R″ is an alkyl or aryl radical, R‴ is a hydrogen atom or an alkyl or aryl radical, and $R^{IV}$ is an alkylene or alkarylene radical.

These cross-linking agents, compared with the methylacetoxysilanes most commonly used previously for the same purpose, and compared also with the amino compounds mentioned above, have the advantage that instead of acetic acid or a nitrogen base a neutral and odorless acid amide is liberated in the cross-linking reaction of the organosiloxane compositions. However, it has proved that these very slightly volatile acid amides can, in the amount formed in this instance, result in a troublesome filling of the elastic end products. A further disadvantage is that the N-silyl-substituted carboxylic acid amides defined above can only be purified with difficulty, if at all, by distillation.

We have now found that a significant improvement of the last-named cross-linking agents can be achieved by replacing some of the carboxylic acid amide radicals by lower alkoxyl radicals. Unexpectedly, in this case the extraordinary water sensitivity of mixtures which contain the known alkoxy silicon compounds as cross-linking agents is not to be observed.

According to the present invention, therefore, a plastically shapable organosiloxane composition which is capable of being stored with the exclusion of water and which under the action of water, including atmospheric humidity, is convertible at temperatures below 50° C., especially at room temperature, into an elastic body comprises:

(1) A siloxane having the formula

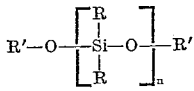

wherein $n$ is a whole number greater than 1, $R'$ is a hydrogen atom or an alkyl radical having at most 4 carbon atoms, at least half of the substituents R are methyl radicals and each remaining substituent R is a hydrogen atom or an alkyl, alkenyl or aryl radical, and which may contain, in addition to its $R_2SiO$ units, up to 10 mol percent of siloxane units of the formula $RSiO_{3/2}$, optionally in admixture with fillers, optionally also with amounts of $\alpha,\omega$-bis-(trimethylsiloxy)-polydimethylsiloxane up to 10 percent by weight of the base siloxane or with (in amounts of up to 50 percent by weight of the base siloxane) methylpolysiloxanes which are composed of $(CH_3)_3SiO_{1/2}$ and $SiO_2$ units in a molar ratio of between 1:1 and 1:2; and (2) A cross-linking agent (optionally diluted with an inert organic solvent) of the formula $X_{4-a}SiY_a$ or the average formula $$X_{m-b}Z_bSiO_{\frac{4-m}{2}}$$

wherein each X is a hydrogen atom or an alkyl or aryl radical, $a=3$ or 4, $m$ is a numerical value in the range of 1 to 3 inclusive, the number $b$ is chosen of such a magnitude that each molecule of the aforesaid average formula contains at least three substituents Z, and one or two per each three of these substituents Z are Si-N bonded carboxylic acid amide radicals of the formula

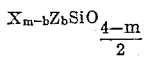

wherein $R''$ is an alkyl or aryl radical, $R'''$ is a hydrogen atom or an alkyl or aryl radical, and $R^{IV}$ is an alkylene or alkarylene radical, and all the remaining substituents Z are alkoxyl radicals having 1 to 4 carbon atoms.

The N-silyl-substituted carboxylic acid amides having the characteristic atom sequence

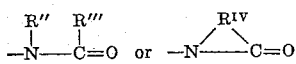

contained at least once in each molecule which are to be used according to the invention as cross-linking agents therefore include organosilanes of the formulae $XSiZ_3$ and $SiZ_4$ and organosiloxanes. They are obtained from alkoxytrihalosilanes, dialkoxydihalosilanes, trialkoxyhalosilanes, organoalkoxydihalosilanes or organodialkoxyhalosilanes, or from organoalkoxyhalosiloxanes containing at least one Si- bonded halogen atom, at least one Si-bonded alkoxyl radical and at least one further Si- bonded halogen atom or one further Si- bonded alkoxyl radical in each molecule, by reaction with a carboxylic acid amide of the formula

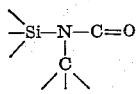

or with a lactam

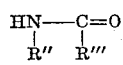

or with oxindole

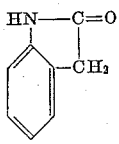

or phthalimidine

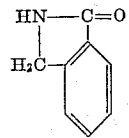

at a temperature up to 80° C. in the presence of an acid-binding agent, for example pyridine or a trialkylamine. These reactions may also be carried out in an inert solvent, e.g., an aliphatic or aromatic hydrocarbon or an ether.

The alkoxyl-halogen derivatives of silane which are used for this purpose may be obtained in known manner by partial alkoxylation of a silicon tetrahalide or an alkyl or aryl trihalosilane with methanol, ethanol, propanol or butanol, or by reaction of a halosilane with an alkoxysilane. By incomplete hydrolysis of the silane derivatives thus obtained the above-mentioned organoalkoxyhalosiloxanes can be prepared according to known methods; the cross-linking agents which are to be obtained from these latter are, however, of secondary importance, since they too can only with difficulty be purified by distillation. The cross-linking agents of formula $X_{4-a}SiZ_a$ on the other hand are readily distillable liquids which are not damaged even by distillation temperatures of 200° C.

The proportion of cross-linking agent in the convertible organopolysiloxanes composition may in principle be very high, but as it exerts a decisive influence on the elasticity of the end product, it is generally used in a proportion of not more than 60 percent by weight, as a rule 2 to 20 percent by weight, of the base siloxane.

The cross-linking reaction is accelerated by the addition of small amounts of a condensation agent, especially a dialkyl tin dicarboxylate in a proportion to the cross-linking agent (2) of between 0.1 and 30 percent by weight. The start of the reaction can be delayed, as in the known cold convertible compositions, by the addition of a small proportion of a carboxylic acid.

The convertible siloxanes (1) whose alkyl, alkenyl or aryl groups R are in the simplest case methyl, vinyl or phenyl, may be obtained in known manner from (optionally mixed) chloro- or alkoxysilanes, which are selected in correspondence with the substitution and functionality of the siloxane units of the organosiloxane required, by hydrolysis with water and subsequent condensation. Another known method is the polymerization of cyclic and linear organosiloxanes by means of alkaline or acidic catalysts, including so-called Lewis acids, which—optionally by washing out or inactivation of the catalyst with water—leads to compounds with terminal SiOH groups or, if the polymerization is carried out after admixture of alkoxysilanes or alkoxysiloxanes, to compounds with terminal alkoxysilyl groups. If a particularly hard end product is desired, up to 10 mole percent siloxane units of the formula $RSiO_{3/2}$ can be introduced into the base siloxane in known manner, either by incorporating them by polymerization or admixing them in the form of polymers composed preponderantly of these groups. The degree of polymerization of the base siloxanes may be varied within wide limits, from disiloxanes, to polysiloxanes with viscosities of several million centistokes at 20° C., i.e., in which several tens of thousands of units are to be assumed.

The organopolysiloxane compositions may also contain the known active and inactive fillers, e.g., chalk, talcum, silica, silica gel, quartz powder, titanium dioxide, iron oxides, zirconium silicate, calcium sulphate, aluminum oxide, magnesium oxide, carbon black, graphite, sand and the known finely divided fillers based on silicon dioxide, the surface of which fillers may also be modified by alkylsilyl or alkoxysilyl groups. The proportion of fillers is generally less than 50 percent by weight of the total composition.

The α,ω-bis-(trimethylsiloxy) - polydimethylsiloxanes which may be admixed into the compositions in amounts up to 10 percent by weight of the base siloxane are commercial oils of viscosities between 100 and some hundreds of thousands of centistokes (20° C.). Their addition has the effect that softer end products are obtained than without them and that the products after converting in molds or on other surfaces do not adhere to these shape-giving supports.

If, on the other hand, adhesive capacity is aimed at in order that the composition may be used as an adhesive there may be admixed with it in known manner, in an amount of up to 50 percent by weight on the base siloxane, a resinous methylpolysiloxane composed of units of the formula $(CH_3)_3SiO_{1/2}$ and an equal number up to double the number of units of the formula $SiO_2$.

Except for the addition of the acylamide derivative used as cross-linking agent, which is as a rule added as last component to the main mixture, the sequence in which the components are mixed is optional.

Since the composition with all its components is to be mixed together into the ready-to-use state while still at the place of manufacture, it is necessary to keep it substantially free from water. For this purpose several methods are suitable: the components may be dried individually at a high temperature and mixed with exclusion of moisture, but it is also possible to prepare the main mixture without particularly careful drying initially and then either to dehydrate it at an elevated temperature, optionally in a vacuum, or to add to it a drying agent which does not interfere with the subsequent cross-linking of the composition. If the main mixture has only a small water content, a small portion of the cross-linking agent according to the invention may itself serve as such a drying agent. Since in this case a small part of the cross-linking is anticipated, provision has then to be made, through the choice of a sufficiently low viscosity of the organo-siloxane component used as basis, to ensure that the subsequent shaping of the composition before its complete conversion is not rendered too difficult. The cross-linking agent or its solution must itself naturally always be protected, also during admixing, from any water access. There is then obtained a mixture which is storable under impervious closure and which after its removal from the container for use may be shaped immediately without further admixture, and whose cross-linking is initiated by the access of atmospheric humidity, or by moistening with water.

The compositions prepared according to the invention, kept in stock as ready-to-use mixtures or separately as main mixture and cross-linking agent, can be used for a number of known purposes; for example (with the choice of suitable fillers) for the production of rubber-elastic articles and for the imbedding of parts of electrical equipment for insulation or for protection from heat, dirt or mechanical damage. With these compositions, dispersions can also be prepared in known manner and used for the coating of fabrics.

Compared with the ready-to-use compositions using alkyltriacyloxysilane as cross-linking agents which have most commonly been used hitherto, and compared also with the compositions described at the beginning of this specification with alkoxyl-free acylamide-substituted silicon compounds as cross-linking agents, the compositions according to the present invention offer a further particular advantage when they are used for sealing joints. Upon the said known compositions there forms already during the usual flushing of a joint length of one to two metres, the more rapidly the warmer and damper the weather, a firmly coherent skin, under which the material remains plastic for a considerable time. This has the consequence that the joint filling can only be inadequately smooth-spread and shows unsightly wrinkles. In contrast to this, the compositions of the invention solidify very much more uniformly, probably due to the fact that the cross-linking agents used herein contain two different groups which react with speeds differing by some powers of ten, so that, from the surface, at first only the amide groups react in a short time with the formation of linkage points at the chain ends or with viscosity-increasing chain lengthening. Cross-linking follows in delayed manner in a continuous solidity gradient.

The following examples are given for the purpose of illustrating the invention, references to "parts" being to parts by weight. Firstly, the production of four organo-silicon compounds substituted with carboxylic acid amines, designated as cross-linking agents A, B, C and D respectively, is described.

CROSS-LINKING AGENT A

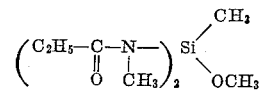

70 parts methylmethoxydichlorosilane are added dropwise, with stirring and with cooling of the reaction vessel with ice, to a solution of 87 parts N-methylpropionamide and 101 parts triethylamine in 850 parts toluene, and the reaction mixture is then stirred for a further 30 minutes. The triethylammonium chloride which is precipitated is separated off by filtration with exclusion of moisture and the residue on the filter is washed three times with (on each occasion) 100 ccm. toluene. The toluene is evaporated from the combined filtrates at 20 mm. Hg and there is distilled from the residue at 0.5 mm. Hg, as main fraction between 100 and 105° C., a colorless liquid of the composition represented by the above formula.

CROSS-LINKING AGENT B

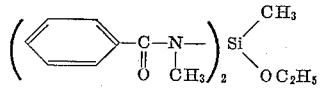

240 parts methyl-ethoxydichlorosilane are added dropwise, with stirring, to a solution of 405 parts N-methylbenzamide and 303 parts triethylamine in 2500 parts toluene. Thereafter the filtration of the precipitated salt and the evaporation of the toluene from the filtrate are effected as described in the case of cross-linking agent A. The ensuing fractional distillation at a pressure between 0.01 and 0.015 mm. Hg yields, at 128 to 130° C., a viscous, pale yellow liquid of the composition represented by the above formula.

CROSS-LINKING AGENT C

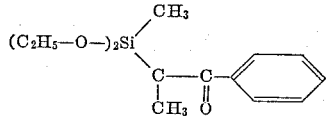

337 parts methyldiethoxychlorosilane are added dropwise, with stirring, to a solution of 270 parts N-methylbenzamide and 202 parts triethylamine in 2000 parts toluene. Thereafter the filtration of the precipitated salt and the evaporation of the toluene from the filtrate are effected as described in the case of cross-linking agent A. From the ensuing distillation there is obtained at a pressure between 0.7 and 0.8 mm. Hg, as main fraction between 104 and 107° C., a pale yellow oil, the composition of which conforms with the above formula.

CROSS-LINKING AGENT D

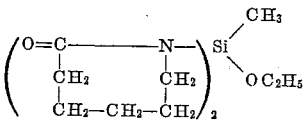

159 parts methylethoxydichlorosilane are added dropwise to a solution of 226 parts ε-caprolactam and 202 parts triethylamine in 1750 parts dry toluene. Thereafter the filtration and evaporation of the toluene are effected as described in the case of cross-linking agent A. From the ensuing distillation there is obtained at a pressure between 0.03 and 0.04 mm. Hg, as main fraction between 140 and 145° C., a colorless oil, the composition of which is in accordance with the above formula.

Example 1

A series of portions, each consisting of 100 parts of an α,ω-dihydroxypolydimethylsiloxane of 18,000 centistokes viscosity at 20° C., prepared in known manner by polymerizing octamethylcyclotetrasiloxane with 0.005 percent by weight potassium hydroxide at 130° C., is in each case mixed first with 0.5 part dibutyl tin dilaurate and then, with exclusion of moisture, with 5 parts of one of the cross-linking agents A, B, C and D. A layer of 4 mm. thickness of each of the thus obtained four mixtures is then poured into open glass vessels where they are exposed to the atmosphere. The cross-linking of the polysiloxane layers commences from the surface and after about 10 hours has progressed to the bottom. There results in all four cases elastic, no longer adhesive organopolysiloxane plates.

Example 2

An organopolysiloxane is used which is obtained in the following manner:

Dry nitrogen is blown at 100° C. for 1½ hours through 2300 g. octamethylcyclotetrasiloxane, which is then heated to 150° C.; 3.45 g. tetravinyl-tetramethylcyclotetrasiloxane, 0.77 g. diphenyldiethoxysilane and 0.1 g. potassium hydroxide are added and heating to 150° C. is continued for 7 hours. There is then obtained a highly viscous α,ω-diethoxypolydiorganosiloxane, the pentrometer value of which is 2430, corresponding to a viscosity of some millions of centistokes at 20° C.

100 parts of this polysiloxane are dissolved in 300 parts toluene; 0.5 part dibutyl tin dilaurate and 5 parts cross-linking agent B are admixed with this solution with exclusion of moisture, and a layer of 3 mm. thickness of the mixture is poured into an open glass vessel and thus left to the action of the atmosphere. After about 10 hours the solvent has evaporated and there remains behind an elastic organopolysiloxane sheet.

Example 3

50 parts of an α,ω-dihydroxypolydimethylsiloxane of 3000 centistokes viscosity at 20° C., prepared in known manner from octamethylcyclotetrasiloxane by polymerization by means of bleaching earth, are kneaded with 30 parts of the finely divided (dried at 120° C.) zirconium silicate obtainable under the trade name "Zirkosil" and 20 parts of the diatomaceous earth (also dried at 120° C.) obtainable under the trade name "Celite Super Floss." Finely, 0.5 part dibutyl tin dilaurate and 5 parts cross-linking agent C are admixed thereto. The ready-to-use composition thus obtained can be stored under air-tight closure without change in viscosity. Exposed to moisture in the air, it converts, starting from the surface, into a rubber-elastic shaped body.

Example 4

87 parts of the same α,ω-dihydroxypolydimethylsiloxane as described in Example 3 are intimately mixed with 13 parts of a colloidally divided silica prepared from silicon tetrachloride by the flame method, and this mixture is dehydrated by heating to 200° C. at 12 mm. Hg until there is a residual water content of 0.08 percent by weight. 0.5 part dibutyl tin dilaurate is then admixed therewith at room temperature. When in each case 20 parts of the paste prepared in this manner are mixed with 1 part of one of the crosslinking agents A, B, C and D, ready-to-use compositions are obtained which, without access of water, show no sign of viscosity increase even after storage of several months' duration at 50° C. Exposed to the atmosphere, however, they yield elastic solid bodies.

What we claim is:

1. A plastically shapable organo-polysiloxane composition storable under exclusion of water and convertible into the solid elastic state under the action of water, including atmospheric humidity, at a temperature of from room temperature to 50° C., comprising:

(1) a siloxane having the formula:

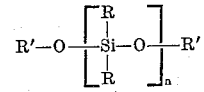

wherein $n$ is a whole number that has a value of at least 1, R' is a member selected from the group consisting of hydrogen and alkyl having up to 4 carbon atoms, at least one half of the substituents R being methyl and each of the remaining substituents R being a member selected from the group consisting of hydrogen, alkyl, alkenyl and aryl; and (2) a cross-linking agent having the formula:

$$X_{4-a}SiZ_a$$

wherein each X is a member selected from the group consisting of hydrogen, alkyl and aryl, $a$ is an integer that has a value of from 3 to 4 and Z is selected from the group consisting of alkoxy containing 1 to 4 carbon atoms and Si-N bonded carboxylic acid amide radicals having the following formula:

wherein R''' is a member selected from the group consisting of hydrogen, alkyl and aryl R'' is alkyl or aryl and R$^{IV}$ is a member selected from the group consisting of alkylene and arylene, there being present at least one alkoxy and one Si-N bonded carboxylic acid amide radical in said cross-linking agent.

2. A plastically shapable organo-polysiloxane composition according to claim 1 wherein said cross-linking agent has the formula:

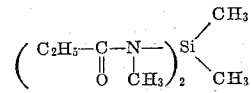

3. A plastically shapable organo-polysiloxane composition according to claim 1 wherein said cross-linking agent has the formula:

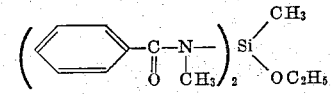

4. A plastically shapable organo-polysiloxane composition according to claim 1 wherein said cross-linking agent has the formula:

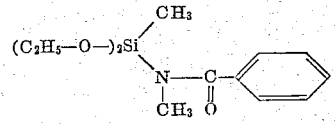

5. A plastically shapable organo-polysiloxane composition according to claim 1 wherein said cross-linking agent has the formula:

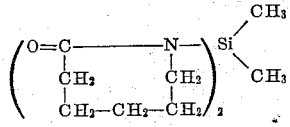

6. A composition as claimed in claim 1 wherein the base siloxane (1) comprises siloxane units of the formula

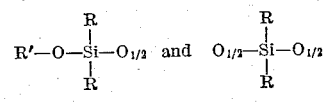

and said base siloxane has an additional content of up to 10 mol percent of siloxane units of the formula

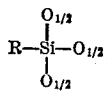

wherein R and R' have the foregoing significance.

7. A composition as claimed in claim 1 wherein said cross-linking agent (2) is utilized diluted with an inert organic solvent.

8. A composition as claimed in claim 1 wherein said organopolysiloxane composition is admixed with a filler.

9. A composition as claimed in claim 1 wherein said organopolysiloxane composition is admixed with a dialkyl tin dicarboxylate in an amount ranging from 0.1 to 30 percent by weight, based on the weight of said cross-linking agent (2).

References Cited

UNITED STATES PATENTS

| | | | |
|---|---|---|---|
| 2,902,468 | 9/1959 | Fianu | 260—46.5 |
| 2,973,383 | 2/1961 | Black | 260—46.5 |
| 3,209,053 | 9/1965 | Gilkey et al. | 260—46.5 |
| 3,249,586 | 5/1966 | Haluska | 260—46.5 |

DONALD E. CZAJA, *Primary Examiner.*

M. I. MARQUIS, *Assistant Examiner.*